Nov. 15, 1927.
J. A. OVERLANDER
1,649,321
PNEUMATIC TIRE VALVE
Filed May 2, 1921
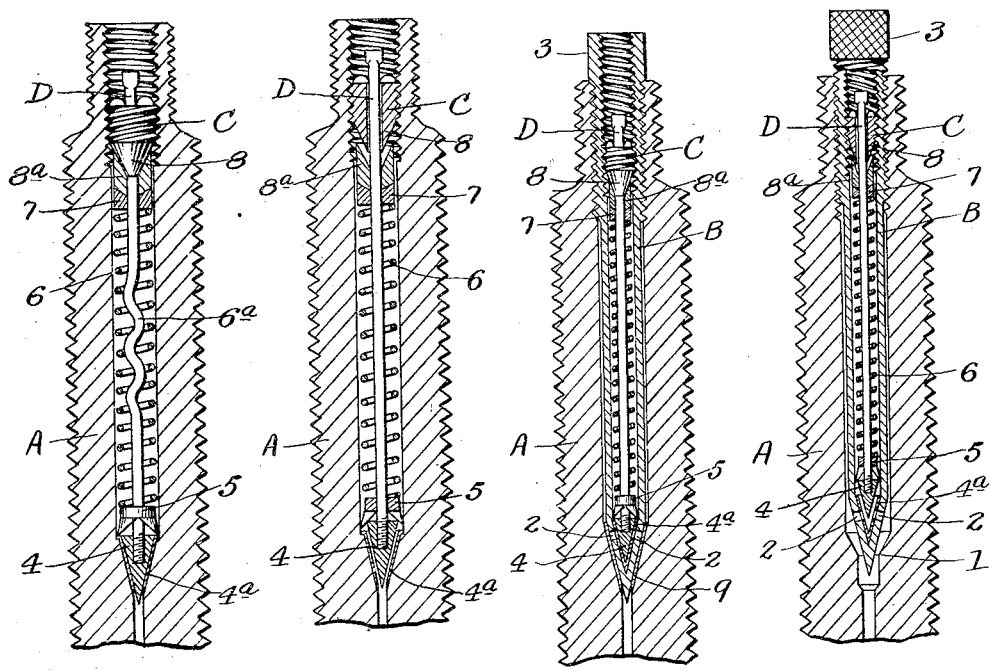
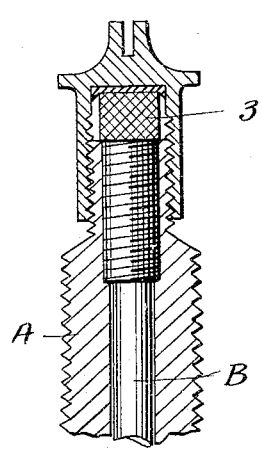
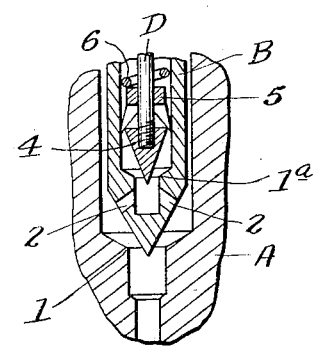
Inventor
Jacob A. Overlander
By            Attorney Patented Nov. 15, 1927.

1,649,321

UNITED STATES PATENT OFFICE.

JACOB ALPHEUS OVERLANDER, OF NEW YORK, N. Y.

PNEUMATIC-TIRE VALVE.

Application filed May 2, 1921. Serial No. 466,260.

The improvement relates to valves for pneumatic tubes which control fluid pressure against back-flow or outlet through the valve after inflation by the manipulation of adjustable valve members, particularly accessible for that purpose in the manner of be hereinafter described.

The objects of the invention are to provide novel means of control over fluid pressure within the inflated tube, to eliminate as far as possible, after inflation, inherent defects in co-operating valve members, and to prevent loss of function by leakage through the occlusion of the passage way in the valve leading the inflated tube by readjustment of the valve members.

The particular description hereinafter in connection with the drawings will show in detail the novelty and utility of the improvement, as well as the simplicity of its operating elements.

Figure 1 is a cross-section of the valve-stem, showing the valve members in elevation; Figure 2 is a cross-section of the valve-stem, showing the valve 4 lifted from its seat; Figure 3 is a cross-section of the valve-stem, showing the valve-sleeve B in position to occlude the back flow of air through the valve; Figure 4 is a cross-section of the valve-stem showing the sleeve-valve lifted for the inlet of air or inflation of the tube; Figure 5 shows the valve cap fitted down over the knurled head 3 of the valve-sleeve; and Figure 6 is an enlarged view of the valve seat 1 with the valve sleeve.

The valve-stem A is constructed similarly in all respects to the ordinary commercial article that is to be had wherever accessories of the class are on sale and is adapted to receive the hollow tubular shell B, having a knurled head 3 extending beyond the valve stem A for manipulation and is screw-threaded to engage the outer threaded portion of the valve sleeve B, Figs. 3 and 4, to form a leak tight joint.

The hollow valve sleeve B with its tapering distal extremity providing a valve seat for the stop valve 4, as well as a valve when in contact with the wall of A, where reduced, Figs. 3 and 4, and the two lateral ports 2—2, which communicate with the passageway through the valve stem A to admit fluid pressure for the inflation of the tube, is entered in the valve stem A in quite the like manner with a cartridge in a gun barrel and houses the check valve proper.

The valve members housed within the valve sleeve B comprises the plug C with its conical valve seat 8 integral therewith, the valve rod D with the valve 7 rigidly soldered thereto, the replaceable cylindrical rubber plug or yielding material, designated as gasket $8^a$, interposed between the valve 7 and its conical valve seat 8, the irregularity $6^a$ in the valve rod D, Figs. 1 and 3, which serves as a take-up between the check valve proper and the stop valve 4, the terminal wedge 5 which holds the coil spring 6 against extension distally from the valve seat 8, the coil spring 6 which retains the valve 7 against the valve seat 8 and compresses the gasket $8^a$ to form a leak tight joint in the valve proper, and a stop valve 4 screwed on the distal or inner end of the valve rod D with the gasket $4^a$ interposed between the stop valve, as stated, and the inner wall of the valve sleeve B, which, when fitted into the conical extremity of the valve sleeve B, is adapted to form a valve seat therewith; which, when lifted, admits fluid pressure through the ports 2—2, if the valve sleeve B is released or slightly or partially withdrawn outward; and which, when adjusted by the plug C, closes the ports 2—2.

In Fig. 4 a different form of valve seat is provided between the distal end of the valve sleeve B and the divergent angularity in the wall of the valve stem A, where reduced, with a common point of contact at 1, when closed, which acts as a cut off and thereby eliminates the gasket 9 in this form of valve. A like construction may be adopted with reference to the stop valve 4 and its seat formed by the inner wall of A, where reduced, Figs. 1 and 2, of the inner wall of B, Figs. 4 and 6, if preferred, in a similar manner omitting the interposed gasket $4^a$ to form an air tight joint with B.

I may now briefly describe how the valve stem A, the valve sleeve B and the several members are operatively combined to function as specified.

The valve sleeve, B as described, with its tapering distal extremity closed except for the ports 2—2, forms a valve with its seat in the wall of A, where reduced, which on manipulation of the knurled head 3 is adjusted to open and close the ports 2—2 by release or partial withdrawal from, or extension into, the valve stem A. Preferably the valve sleeve should be of brass to insure rustless joints wherever in contact with other metallic parts, such as iron, of the valve stem and valve members and being an alloy it will grind down by use and wear to a perfectly smooth valve seat and an air tight joint.

In the valve proper the stop valve 4 is screwed on the distal end of the valve rod D and is controlled by the adjustment of the threaded plug C, either inward or outward as the case may be, which increases and decreases the tension of the coil spring 6 and the compression of the replaceable yielding gasket 8ª. By partial withdrawal of the plug C the coil spring 6 is released and extends lifting the valve rod D, which carries the stop valve 4, thus opening the ports 2—2 in the valve sleeve B, which lead to the passageway through the valve stem A, Figs. 3 and 4, or directly as in Figs. 1 and 2; by manipulation of the plug C in the reverse or contrary direction it is obvious that the ports 2—2, Figs. 3 and 4, or the passageway as in Figs. 1 and 2, are not only closed but also the tension of the coil spring 6 is increased, as stated, with a resulting greater compression of the replaceable rubber gasket 8ª, thereby providing further against the outflow of air through the valve.

It may be stated that in the form of valve as shown and described by replacing the single element, the cylindrical rubber gasket 8ª, the valve is renewed or rebuilt in a manner that is practically inexpensive, so that the function of the valve may be restored to the like condition as when new.

Having described what new and useful features are embodied in the improvement referred to, I claim:

1. In a valve a tubular member housing a valve therein, said tubular member being adapted to receive a threaded plug, a threaded plug entered therein having a conical valve seat integral therewith, a valve rod, a valve rigidly attached thereto, a yielding material replaceably interposed between the valve and its conical seat, the bore of the tubular member tapering inwardly to the passageway therethrough to serve as a valve seat, a valve oppositely disposed to the first mentioned valve and rigidly attached to the valve rod entered therein, a spiral spring for holding the valve proper against its conical seat and a yielding material interposed between the valve and the tapering wall of the tubular member thereby forming a stop-valve against the back flow of air by the adjustment of the threaded plug.

2. In a valve a tubular member housing a check valve, said tubular member being adapted to receive a threaded plug, a threaded plug entered therein, a conical valve seat formed thereon and integral therewith, a valve rod, a valve rigidly attached thereto, a tapering plug oppositely disposed to the first mentioned valve, rigidly secured to the distal end of the valve rod and tubular member an irregularity in the valve rod intermediate said valves to serve as a take-up, yielding material interposed between the valves and their seats, respectively, and a spiral spring compressed between the first mentioned valve and a terminal wedge lodged in the angle of the wall of the tubular member where reduced, to limit the extension of the spiral spring and to hold the first mentioned valve against its conical seat and the last mentioned valve in open position.

3. In a pneumatic valve a valve stem adapted to engage a valve sleeve, a tubular valve sleeve adjustably entered therein having a knurled cap without the valve stem, a tapering distal extremity serving as an auxiliary valve, lateral ports therein and internal threads to receive a valve plug, a valve plug adjustably entered in the valve sleeve having a conical valve seat integral therewith, a valve rod, a valve rigidly secured thereto, a yielding material interposed between the valve and valve seat, the tapering bore of said valve sleeve being adapted to serve as a valve seat for a stop valve screwed on the distal end of a valve rod, a conical stop valve oppositely disposed to the first mentioned valve and rigidly secured to the valve rod, and a yielding material interposed between the stop valve and the tapering seat of the valve sleeve to cut off the back flow of air through the valve proper by adjustably entering the valve plug in the valve sleeve.

4. In a pneumatic valve a valve stem housing an adjustable valve sleeve, an adjustable valve sleeve engaged therein that has a tapering distal extremity serving as an auxiliary valve which is provided with lateral ports, houses a check valve and is adapted to engage a valve plug of a check valve, a valve plug entered therein, a conical seat integral therewith, a valve rod, a valve rigidly secured thereto, a tapering plug oppositely disposed to the first mentioned valve screwed on the distal end of the valve rod, the inner wall of the valve sleeve, where reduced, having divergent planes formed by the bore with a sharp, smooth annular intersecting angle for contact with said tapering plug and a spiral spring compressed between a terminal wedge in the valve sleeve and the valve to lift the tapering plug and hold the valve against its seat on outward adjustment of the valve proper.

5. In a fluid pressure valve a valve stem housing an adjustable valve sleeve and having a bore with an outer wall formed by divergent planes, the intersecting angle of which is a sharp, smooth annulus for contact with the conical end of the valve sleeve, an adjustable valve sleeve engaged therein that has oppositely disposed vents through its conical inner end arranged outwardly from a sharp, smooth annulus formed by the angularity of the wall of the valve stem to contact therewith, said valve sleeve being adapted to engage a valve plug, a valve plug entered therein having a conical seat integral therewith, a valve rod, a valve rigidly secured thereto, a yielding material interposed between the valve and its seat, the tapering bore of the valve sleeve being adapted to serve as a valve seat for the stop valve screwed on the distal end of the valve rod, a conical stop valve rigidly secured to the valve rod, and oppositely disposed to the first mentioned valve, a yielding material interposed between the stop valve and the tapering seat of the valve sleeve to form a leak tight joint, and a spiral spring compressed between the valve proper and a terminal wedge lodged at the angle of reduced bore of the valve sleeve to hold the valve proper against its seat and the stop valve in open position.

6. In a fluid pressure valve a valve stem that is provided with a sharp, smooth annulus in the wall formed by divergent planes of the bore, where reduced, for contact with a tapering distal end of an adjustable valve sleeve inwardly from ports therethrough and adapted to engage the valve sleeve, a tubular adjustable valve sleeve entered therein that has a tapering distal end with lateral ports through the body of the sleeve and a sharp, smooth annulus in its inner wall formed by the divergent planes of the bore, where reduced, to contact with a stop valve rigidly secured to a valve rod, said valve sleeve housing a check valve, an adjustable valve plug engaged therein, a conical valve seat integral with the valve plug, a valve rod, a valve rigidly secured to the valve rod, a replaceable gasket interposed between the valve and its conical valve seat, a stop valve oppositely disposed to the first mentioned valve, screwed on the inner end of the valve rod and adapted to form a leak tight joint against the annulus of the valve sleeve, a wedge lodged in the angle of the valve sleeve, where reduced, to limit extension of a spiral spring inwardly and a spiral spring compressed between the terminal wedge and the valve proper to hold the valve against its seat and the stop valve open when released by adjustment of the valve plug.

JACOB ALPHEUS OVERLANDER.